US008080606B2

(12) United States Patent
Isozaki et al.

(10) Patent No.: US 8,080,606 B2
(45) Date of Patent: Dec. 20, 2011

(54) POLYCARBONATE RESIN COMPOSITION AND MOLDED ARTICLE THEREOF

(75) Inventors: Toshio Isozaki, Chiba (JP); Yoshio Ikeda, Chiba (JP); Yasuhiro Ishikawa, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 112 days.

(21) Appl. No.: 10/589,639

(22) PCT Filed: Mar. 8, 2005

(86) PCT No.: PCT/JP2005/003936
§ 371 (c)(1),
(2), (4) Date: Aug. 16, 2006

(87) PCT Pub. No.: WO2005/085353
PCT Pub. Date: Sep. 15, 2005

(65) Prior Publication Data
US 2007/0179233 A1 Aug. 2, 2007

(30) Foreign Application Priority Data
Mar. 9, 2004 (JP) ................. 2004-065905

(51) Int. Cl.
*C08K 3/30* (2006.01)
*C08K 5/092* (2006.01)
*C08K 5/13* (2006.01)
*C08K 5/54* (2006.01)

(52) U.S. Cl. ......... 524/508; 524/418; 524/506; 525/101

(58) Field of Classification Search ................. 524/418, 524/506, 508; 525/67, 101, 147, 148, 439, 525/468, 100, 464; 639/418, 506
See application file for complete search history.

(56) References Cited

U.S. PATENT DOCUMENTS

| | | | | |
|---|---|---|---|---|
| 4,303,575 A * | 12/1981 | Reinert | ......... | 524/112 |
| 4,569,970 A * | 2/1986 | Paul et al. | ......... | 525/67 |
| 4,786,686 A * | 11/1988 | Laughner et al. | ......... | 525/67 |
| 4,895,897 A * | 1/1990 | Kaufman | ......... | 525/67 |
| 5,270,386 A * | 12/1993 | Laughner | ......... | 525/66 |
| 5,369,154 A * | 11/1994 | Laughner | ......... | 523/436 |
| 6,001,929 A * | 12/1999 | Nodera et al. | ......... | 525/92 E |
| 6,995,211 B2 * | 2/2006 | Nodera et al. | ......... | 525/101 |
| 2002/0123567 A1 * | 9/2002 | Warth et al. | ......... | 525/67 |
| 2004/0013882 A1 * | 1/2004 | Gorny et al. | ......... | 428/412 |
| 2004/0030044 A1 * | 2/2004 | Okamoto et al. | ......... | 525/63 |
| 2004/0030090 A1 * | 2/2004 | Meyer et al. | ......... | 528/370 |
| 2004/0054045 A1 * | 3/2004 | Nodera et al. | ......... | 524/261 |
| 2004/0059068 A1 * | 3/2004 | Nodera | ......... | 525/474 |

FOREIGN PATENT DOCUMENTS

| | | | |
|---|---|---|---|
| EP | 1201715 A1 * | 5/2002 | |
| JP | 5-117382 | 5/1993 | |
| JP | 2004-35587 | 2/2004 | |
| JP | 2004 59690 | 2/2004 | |
| WO | WO 0236687 A1 * | 5/2002 | |
| WO | WO 02057369 A1 * | 7/2002 | |

OTHER PUBLICATIONS

Wypych, George (2000). Handbook of Fillers: A Definitive User's Guide and Databook (2nd Edition). ChemTec Publishing. p. 150. Online version available at http://knovel.com/web/portal/browse/display?_EXT_KNOVEL_DISPLAY_bookid=1011&VerticalID=0.*
Office Action issued Aug. 31, 2010, in Japan Patent Application No. 2004-065905.

* cited by examiner

*Primary Examiner* — Milton I Cano
*Assistant Examiner* — Darcy D Laclair
(74) *Attorney, Agent, or Firm* — Oblon, Spivak, McClelland, Maier & Neustadt, L.L.P.

(57) ABSTRACT

A polycarbonate resin composition, which exhibits not only an excellent balance among fluidity, rigidity, heat resistance, and impact resistance while maintaining flame retardance but also an excellent performance of recycling efficiency and a molded article thereof are provided. The polycarbonate resin composition contains a resin mixture of component (A) which is composed of (A-1) 10 to 100 mass % of an aromatic polycarbonate resin wherein dihydroxybiphenyl is used in a part of a divalent phenol as the raw material thereof and (A-2) 90 to 0 mass % of an aromatic polycarbonate resin other than the aromatic polycarbonate resin of component (A-1), and an amorphous styrene resin (B), in a mass ratio of component (A) to component (B) of 50:50 to 95:5. The molded article is an injection-molded article made of the polycarbonate resin composition.

14 Claims, No Drawings

POLYCARBONATE RESIN COMPOSITION AND MOLDED ARTICLE THEREOF

This application is a 371 of PCT/JP05/03936, filed Mar. 8, 2005.

TECHNICAL FIELD

The present invention relates to a polycarbonate resin composition and an injection-molded article which is made of the polycarbonate resin composition through injection-molding. More specifically, the present invention relates to a polycarbonate resin composition which exhibits not only an excellent balance among fluidity, rigidity, heat resistance, and impact resistance while maintaining flame retardance, but also an excellent performance of recycling efficiency, and an injection-molded article thereof. The injection-molded article is suitably used for automobile parts, or housings for various kinds of articles or parts for OA (office automation) instruments, electrical and electronics instruments or home electric appliances.

BACKGROUND ART

A polymer alloy system of polycarbonate resin and styrene has been widely used in many fields such as home electric appliances or automobiles due to its excellent mechanical properties such as rigidity and impact resistance, and also its excellent fluidity, heat resistance, electrical properties, and dimensional stability. In recent years, in view of reducing weight, articles or parts with still thinner walls are requested, so that the material used for these articles or parts is required to have an improved fluidity.

Polycarbonate resin is self-extinguishing by itself, but its flame retardance is lowered by alloying. When polycarbonate resin is used as a material for OA, telecommunication, or electric and electrical instruments, the flame retardance of polycarbonate resin is required to be leveled up to ensure still higher safety.

In the polymer alloy system of polycarbonate resin and styrene, fluidity is generally improved by increasing the content of styrene resin or by decreasing the molecular weight of polycarbonate resin. However, increase in styrene resin content leads to lowering in surface impact strength and also in flame retardance. Decreasing in the molecular weight of polycarbonate resin leads to lowering in Izod impact strength and elongation. Thus, it is rather difficult to get good balance between these properties and fluidity.

A method of adding a plasticizer to polycarbonate resin is an older method for improving fluidity of polycarbonate resin (referred to, for example, Patent Document 1). A phosphoric acid ester has been used as a plasticizer for a polycarbonate-based material and is known to provide relatively good balance between fluidity and impact resistance, and also provide flame retardance. However, phosphoric acid ester added brings such problems of lowering in heat resistance of the material itself, sticking of the material to molds on molding, failures in appearance of molded articles, and lowering in recycling efficiency caused by hydrolysis of polycarbonate resin. In order to solve these problems, a silicone-based material has been developed as a next-generation flame retardant material, but a material having a sufficient fluidity which meets the specification of large-size molded articles has not yet been developed.

Patent Document 1: Japanese Patent Application Publication (JP-B) No. Heisei 7 (1995)-68445

DISCLOSURE OF THE INVENTION

Problems to be Solved by the Invention

The present invention has been carried out in view of the above-described circumstances. It is an object of the present invention to provide a polycarbonate resin composition which exhibits not only an excellent balance among fluidity, rigidity, heat resistance and impact resistance while maintaining flame retardance, but also an excellent performance of recycling efficiency, and a molded article thereof.

Means for Solving the Problems

The present inventors have intensively investigated to attain the above objective, and as a result, it has been found that a resin composition which is given by mixing a polycarbonate resin composition and an amorphous styrene resin in a specific ratio, wherein the polycarbonate resin composition comprises a polycarbonate resin whole or part of which is made from a polycarbonate-biphenol copolymer, exhibits not only an excellent balance among fluidity, rigidity, heat resistance and impact resistance while maintaining flame retardance, but also excellent performances in moldability, long-time stability and recycling efficiency. Further, it has been found that a molded article made of the resin composition through injection molding has good appearance. The present invention has been accomplished based on the above findings.

Accordingly, the present invention provides a polycarbonate resin composition and a molded article thereof described as follows.

1. A polycarbonate resin composition comprising a resin mixture of component (A) which is composed of (A-1) 10 to 100 mass % of an aromatic polycarbonate resin wherein dihydroxybiphenyl is used in a part of a divalent phenol as the raw material thereof and (A-2) 90 mass % to 0 mass % of an aromatic polycarbonate resin other than the aromatic polycarbonate resin of component (A-1), and an amorphous styrene resin (B), in a mass ratio of component (A) to component (B) of 50:50 to 95:5.
2. The polycarbonate resin composition as described in 1 above, wherein the amorphous styrene resin of component (B) is a copolymer of a (poly)styrene which is polymerized in the presence or absence of a rubber-like polymer and at least one kind selected from acrylonitrile and methyl methacrylate.
3. The polycarbonate resin composition as described in 1 or 2 above, wherein the aromatic polycarbonate resin of component (A-2) is an aromatic polycarbonate resin containing polyorganosiloxane.
4. The polycarbonate resin composition as described in 3 above, wherein the polyorganosiloxane in the aromatic polycarbonate resin containing polyorganosiloxane is polydimethylsiloxane.
5. The polycarbonate resin composition as described in any of 1 to 4 above, which contains an inorganic filler (C) in an amount of 1 part by mass to 20 parts by mass with respect to 100 parts by mass of the sum of component (A) and component (B).
6. The polycarbonate resin composition as described in any of 1 to 5 above, which contains an impact resistance improver (D) in an amount of 115 parts by mass with respect to 100 parts by mass of the sum of component (A) and component (B).
7. The polycarbonate resin composition as described in one of 1 or 2 above, which contains at least one kind of component selected from organic alkali metal salts and organic alkaline earth metal salts (E) in an amount of 0.05 to 2 parts by mass with respect to 100 parts by mass of the sum of component (A) and component (B).
8. The polycarbonate resin composition as described in 7 above, wherein component (E) is at least one kind selected from alkali metal sulfonate, alkaline earth metal sulfonate, alkali metal polystyrene sulfonate, and alkaline earth metal polystyrene sulfonate.
9. The polycarbonate resin composition as described in 7 or 8 above, which contains an inorganic filler (C) in an amount of 1 to 20 parts by mass with respect to 100 parts by mass of the sum of component (A) and component (B).
10. The polycarbonate resin composition as described in any of 7 to 9 above, which contains an impact resistance improver (D) in an amount of 1 to 15 parts by mass with respect to 100 parts by mass of the sum of component (A) and component (B).
11. An injection-molded article made of the polycarbonate resin composition as described in any of 1 to 10 above.

EFFECT OF THE INVENTION

According to the present invention, there are provided a polycarbonate resin composition which exhibits not only an excellent balance among fluidity, rigidity, heat resistance and impact resistance, but also an excellent performance of recycling efficiency, and an injection-molded article thereof.

BEST MODE FOR CARRYING OUT THE INVENTION

In the polycarbonate resin composition according to the present invention, the aromatic polycarbonate resin wherein a dihydroxybiphenyl is used in a part of a divalent phenol as the raw material (A-1) can be produced by using a divalent phenol mixture of a divalent phenol other than dihydroxybiphenyl and dihydroxybiphenyl in the same manner as the aromatic polycarbonate resin (A-2) described below. There is no limitation on the polycarbonate resin (A-2) and there may be mentioned various kinds of resins. Generally, used is an aromatic polycarbonate which is produced by reacting a divalent phenol and a carbonate precursor. An aromatic polycarbonate produced by the reaction between the divalent phenol and the carbonate precursor in solution or melt can be used, that is, by the reaction between the divalent phenol and phosgene or ester exchange reaction between the divalent phenol and a diphenyl carbonate.

There may be mentioned various kinds of divalent phenols, particularly 2,2-bis(4-hydroxyphenyl)propane [bisphenol A], bis(4-hydroxyphenyl)methane, 1,1-bis(4-hydroxyphenyl)ethane, 2,2-bis(4-hydroxy-3,5-dimethylphenyl)propane, bis(4-hydroxyphenyl)cycloalkane, bis(4-hydroxyphenyl)oxide, bis(4-hydroxyphenyl)sulfide, bis(4-hydroxyphenyl)sulfone, bis(4-hydroxyphenyl)sulfoxide, bis(4-hydroxyphenyl) ether, bis(4-hydroxyphenyl) ketone and the like.

Particularly suitable divalent phenols are bis(hydroxyphenyl)alkanes, especially, a divalent phenol having bisphenol A as a main raw material.

As the carbonate precursor, there can be listed carbonyl halide, carbonyl ester, or haloformate, specifically, phosgene, dihaloformate of divalent phenol, diphenylcarbonate, dimethylcarbonate, and diethylcarbonate. Further, as the divalent phenols, hydroquinone, resorcin, catechol and the like can be listed. These divalent phenols can be used solely or as a mixture of two or more kinds.

In addition, the polycarbonate resin of components (A-1) and (A-2) optionally have a branched structure. As a branching agent, listed is 1,1,1-tris(4-hydroxyphenyl)ethane, α,α', α''-tris(4-hydroxyphenyl)-1,3,5-triisopropylbenzene, fluoroglycine, trimellitic acid, isatin bis(o-cresol) and the like. For molecular weight modification, phenol, p-t-butylphenol, p-t-octylphenol, p-cumylphenol or the like is used.

Further, as the polycarbonate resins which are used for component (A-1) and component (A-2) in the present invention, it is also possible to use a copolymer such as a polyester-polycarbonate resin which is given by polymerizing a polycarbonate in the presence of a bifunctional carboxylic acid such as terephthalic acid or an ester precursor such as an ester-forming derivative of the bifunctional carboxylic acid, or a mixture of various kinds of polycarbonate resins.

The polycarbonate resins which are used for component (A-1) and component (A-2) in the present invention have a viscosity average molecular weight of generally 10,000 to 50,000, preferably 13,000 to 35,000, more preferably 15,000 to 20,000. The viscosity average molecular weight (Mv) is determined as follows: the viscosity of a methylene chloride solution is measured at 20° C. with Ubbellohde viscometer; a limiting viscosity [η] is obtained from thus measured viscosity; then, Mv is calculated from [η] using the following equation.

$$[\eta]=1.23\times10^{-5}Mv^{0.83}$$

An aromatic polycarbonate resin containing polyorganosiloxane can also be used as the polycarbonate resins used for component (A-1) and component (A-2) in the polycarbonate resin composition according to the present invention. The aromatic polycarbonate resin containing polyorganosiloxane is composed of a polycarbonate moiety and a polyorganosiloxane moiety, and can be for example prepared as follows: a polycarbonate oligomer and a polyorganosiloxane which provides the polyorganosiloxane moiety and has functional groups on its molecular end are dissolved in a solvent such as methylene chloride; to the resultant reaction mixture is added an aqueous sodium hydroxide solution containing bisphenol A; and then, the reaction mixture is subjected to interfacial polycondensation in the presence of a catalyst such as triethylamine.

The aromatic polycarbonate resin containing polyorganosiloxane is disclosed, for example, in Japanese Patent Application Laid-Open Nos. Heisei 3(1991)-292359, Heisei 4(1992)-202465, Heisei 8(1996)-81620, Heisei 8(1996)-302178, and Heisei 10(1998)-7897.

The polycarbonate moiety of the aromatic polycarbonate containing polyorganosiloxane has a polymerization degree of preferably 3 to 100, and the polyorganosiloxane moiety has a polymerization degree of preferably 2 to 500. The aromatic polycarbonate resin contains polyorganosiloxane in an amount of generally 0.1 to 2mass %, preferably 0.3 to 1.5 mass %.

The aromatic polycarbonate resin containing polyorganosiloxane used in the present invention has a viscosity average molecular weight of generally 5,000 to 100,000, preferably 10,000 to 30,000, more preferably 12,000 to 30,000.

The aromatic polycarbonate resin containing polyorganosiloxane is useful in view of improvement of impact resistance. As the polyorganosiloxane in the aromatic polycarbonate resin containing polyorganosiloxane, there may be mentioned preferably polydimethylsiloxane, polydiethylsiloxane, and polymethylphenylsiloxne, particularly preferably polydimethylsiloxane.

The viscosity average molecular weight (Mv) of the aromatic polycarbonate resin containing polyorganosiloxane can be evaluated similarly to the above-described polycarbonate resin.

In the present invention, it is preferred that the aromatic polycarbonate resin containing polyorganosiloxane is used as component (A-2).

Further, in the polycarbonate resin composition according to the present invention, as the polycarbonate resin for component (A-1) and component (A-2) can be used a polycarbonate resin containing an alkyl group having 10 to 35 carbon atoms on its molecular end.

The polycarbonate resin containing an alkyl group having 10 to 35 carbon atoms on its molecular end can be obtained by using alkylphenols having 10 to 35 carbon atoms as a molecular end terminator in the production of polycarbonate resin.

As these alkylphenols there may be mentioned decylphenol, undecylphenol, dodecylphenol, tridecylphenol, tetradecylphenol, pentadecylphenol, hexadecylphenol, heptadecylpheol, octadecylphenol, nonadecylphenol, icosylphenol, docosylphenol, tetracosylphenol, hexacosylphenol, octacosylphenol, triacontylphenol, dotriacontylphenol, pentatriacontylphenol and the like.

The alkyl group of these alkylphenols can be placed in any position of o-, m-, or p-with respect to hydroxyl group, but preferably in the position of p-. The alkyl group can be in the form of straight chain, branched chain, or their mixture.

At least one of the substituted groups of these alkylphenols is the above-described alkyl group having 10 to 35 carbon atoms, and there is no limitation on the other four groups, which can be an alkyl group having 1 to 9 carbon atoms, an aryl group having 6 to 20 carbon atoms, a halogen atom, or unsubstituted.

The polycarbonate resin containing an alkyl group having 10 to 35 carbon atoms on its molecular end can be any polycarbonate resin described below, and is obtained by using these alkylphenols as a molecular end terminator so as to modify molecular weight in the reaction between divalent phenols and phosgene or carbonate ester compounds.

For example, the polycarbonate resin containing an alkyl group having 10 to 35 carbon atoms on its molecular end is obtained through a reaction between divalent phenol and phosgene or polycarbonate oligomer in methylene chloride solvent in the presence of a triethylamine catalyst and the above-described phenol containing an alkyl group having 10 to 35 carbon atoms. In this reaction, the phenol containing an alkyl group having 10 to 35 carbon atoms works to terminate one or both molecular ends of a polycarbonate resin, thereby the molecular ends of the polycarbonate resin are modified. In this modification, 20% or more, preferably 50% or more of the molecular ends are terminated with respect to the total molecular ends. The other molecular ends are terminated with hydroxyl groups or with the other molecular end terminators described below.

As the other molecular end terminators, there can be listed phenol, p-cresol, p-tert-butylphenol, p-tert-octylphenol, p-cumylphenol, p-nonylphenol, p-tert-amylphenol, bromophenol, tribromophenol, pentabromophenol and the like which is used commonly in the production of polycarbonate resin. Among them, a compound which contains no halogen is preferred from the environmental point of view.

In order to obtain higher fluidity, an aromatic polycarbonate resin containing an alkyl group having 10 to 35 carbon atoms on its molecular end is preferred. Having an alkyl group with 10 or more carbon atoms on the molecular end improves the fluidity of the polycarbonate resin composition. To the contrary, having an alkyl group with 36 or more carbon atoms on the molecular end lowers the heat resistance and impact resistance of the polycarbonate resin composition.

As mentioned above, the aromatic polycarbonate resin in which dihydroxybiphenyl is used as a part of the raw material divalent phenol of component (A-1) can be prepared by using a divalent phenol mixture of dihydroxybiphenyl and a divalent phenol other than dihydroxybiphenyl similarly to the aromatic polycarbonate of component (A-2). As dihydroxybiphenyl can be listed a compound having the following general formula (I):

[Formula 1]

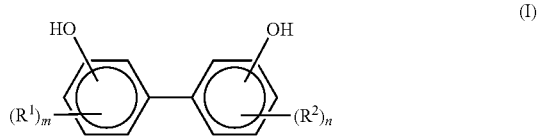

(I)

(wherein $R^1$ and $R^2$ represent independently a group selected from a hydrogen atom, an alkyl group having 1 to 6 carbon atoms, a cycloalkyl group having 5 to 7 carbon atoms, a substituted or unsubstituted aryl group having 6 to 12 carbon atoms and halogen atom; m and n are each an integer of 1 to 4).

Specifically, as the compound having the general formula (I), there is listed 4,4'-dihydroxybiphenyl, 3,3'-dimethyl-4,4'-dihydroxybiphenyl, 3,5,3',5-tetramethyl-4,4'-dihydroxybiphenyl, 3,3'-diphenyl-4,4'-dihydroxybiphenyl, or 2,3,5,6,2',3',5',6'-hexafluoro-4,4'-dihydroxybiphenyl. These dihydroxybiphenyls are used in combination with divalent phenols when the aromatic polycarbonate is polymerized. The dihydroxybiphenyls are used in an amount of generally 5 to 50 mol %, preferably 5 to 30 mol % with respect to the total mounts of divalent phenols. A sufficient flame retardance can be obtained when the amount of the dihydroxybiphenyls is 5 mol % or more, and an excellent impact resistance can be obtained when the amount is 50 mol % or less.

Component (A) in the resin composition according to the present invention is a resin mixture which is composed of an aromatic polycarbonate of component (A-1) in an amount of 10 to 100 mass % and another aromatic polycarbonate of component (A-2) in an amount of 90 to 0 mass %. When component (A-1) is 10 mass % or more, expected improvement in flame retardance can be obtained. Component (A-1) is preferably 15 to 100 mass %, and component (A-2) is preferably 85 to 0 mass %.

Component (B) of the resin composition according to the present invention is an amorphous styrene resin which includes a rubber modified styrene resin and/or a rubber non-modified styrene resin. The rubber modified styrene resin described above refers to a matrix composed of a vinylaromatic polymer containing a rubber-like polymer, and is obtained by polymerizing in the presence of a rubber-like polymer a monomer mixture containing aromatic vinyl monomers and optionally vinyl monomers which are copolymerizable with the aromatic vinyl monomers through known polymerization method such as bulk polymerization, emulsion polymerization, or suspension polymerization.

There are various kinds of styrene resins for the rubber modified styrene resins and/or rubber non-modified styrene resins. Among them, a rubber modified styrene copolymer or a rubber non-modified styrene copolymer which is obtained by using styrene monomer and acrylonitrile or methylmethacrylate is preferable as a monomer other than styrene in combination, because the resultant rubber modified styrene copolymer or rubber non-modified styrene copolymer improves the miscibility with polycarbonate. Specifically, there are listed ABS resin (acrylonitrile-butadiene rubber-styrene copolymer), AES resin (acrylonitrile-ethylenepropylene rubber-styrene copolymer), AAS resin (acrylonitrile-acrylic rubber-styrene copolymer), MBS resin (methylmethacrylate-butadiene rubber-styrene copolymer), AS resin (acrylonitrile-styrene copolymer), and MS resin (methylmethacrylate-styrene copolymer).

In the resin composition according to the present invention, the amorphous styrene resin of component (B) is required to be contained in an amount of 5 mass % to 50 mass % with respect to the sum of component (A) and component (B). An amount less than 5 mass % of component (B) does not improve fluidity, while an amount more than 50 mass % of component (B) leads to lowering in heat resistance, impact resistance (surface impact strength and Izod impact strength), and flame retardance. Component (B) is contained in an amount of preferably 10 to 40 mass %.

With the polycarbonate resin composition according to the present invention an inorganic filler of component (C) can be admixed optionally so as to improve rigidity and flame retardance. As the inorganic filler, talc, mica, kaolin, diatomaceous earth, calcium carbonate, calcium sulfate, barium sulfate, glass fiber, carbon fiber, potassium titanate and the like is listed. Among these inorganic fillers, talc or mica which has a plate-form shape is particularly preferable. Talc, which is a hydrated silicate of magnesium, generally on the market can be used. Further talc used in the present invention has an average particle diameter of generally 0.1 to 50 μm, preferably 0.2 to 20 μm.

In the resin composition according to the present invention, the inorganic filler of component (C) is contained in an amount of generally 1 to 20 parts by mass, preferably 2 to 15 parts by mass with respect to 100 parts by mass of the sum of component (A) and component (B).

With the polycarbonate resin composition according to the present invention an impact resistance improver of component (D) can be admixed optionally so as to improve impact resistance. As the impact resistance improver, a core-shell elastomer is preferable. The core-shell elastomer has a double structure consisting of a core and a shell. The core is in a soft rubber-like state and the shell around the surface of the core is in a hard resin state. The elastomer itself is in the form of powder (or particles) and is a grafted rubber-like elastic body. When this core-shell elastomer is melt-blended with the polycarbonate resin, most of the original particle form of the core-shell elastomer is kept unchanged. In this way, most of the particles of the core-shell elastomer melt-blended keep their original form, so that they are uniformly dispersed and provide an effect of causing no peeling off of the surface layer.

Various kinds of the core-shell elastomers can be listed. As the commercially available ones there may be mentioned, for example, "EXL2603" (Kureha Corp.), "Hiblen B621" (ZEON Corp.), "KM-330" (Rohm & Haas Company), "METABLEN W529", "METABLEN WS2001", "METABLEN C223", and "METABLEN B621" (all from MITSUBISHI RAYON Co.,Ltd.).

In the resin composition according to the present invention, the impact resistance improver of component (D) is contained in an amount of generally 1 to 15 parts by mass, preferably 3 to 10 parts by mass with respect to 100 parts by mass of the sum of component (A) and component (B). An amount of one or more parts by mass of component (D) provides an effect of improving impact resistance, while an amount of 15 or less parts by mass can maintain flame retardance, heat resistance, and rigidity.

With the polycarbonate resin composition according to the present invention one or more kinds of component (E) selected from organic alkali metal salts and organic alkaline earth metal salts can be admixed optionally so as to improve flame retardance. Among various kinds of organic alkali metal salts and organic alkaline earth metal salts, there are listed the alkali metal salts or alkaline earth metal salts of an organic acid or organic acid ester having one or more carbon atoms. The organic acid or organic acid ester includes an organic sulfonic acid an organic carboxylic acid and the like. The alkali metal denotes lithium, sodium, potassium, cesium and the like, and the alkaline earth metal denotes magnesium, calcium, strontium, barium and the like. Among them, sodium and potassium salts are preferably used. Their organic acid salts can be substituted with halogen such as fluorine, chlorine, or bromine. The organic alkali metal salts and organic alkaline earth metal salts can be used solely or two or more kinds in combination.

Among the above-described various kinds of organic alkali metal salts and organic alkaline earth metal salts, for example, in the case of an organic sulfonic acid, an alkali metal salt and an alkaline earth metal salt of a perfluoroalkane sulfonic acid having the following general formula (II) are preferably used.

$(CaF_{2a+1}SO_3)_bM$ (II)

(wherein "a" is an integer of 1 to 10; M is alkali metal such as lithium, sodium, potassium, cesium and the like, or alkaline earth metal such as magnesium, calcium, strontium, barium and the like; "b" is the atomic valency of M). For example, the compounds which are described in Japanese Patent Application Publication (JP-B) No.Showa 47 (1972)-40445 correspond to these compounds.

In the above-described general formula (II), as the perfluoroalkane sulfonic acid, there can be listed, for example, perfluoromethane sulfonic acid, perfluoroethane sulfonic acid, perfluoropropane sulfonic acid, perfluorobutane sulfonic acid, perfluoromethylbutane sulfonic acid, perfluorohexane sulfonic acid, perfluoroheptane sulfonic acid, perfluoro-octane sulfonic acid and the like. Particularly their potassium salts are suitably used. In addition, there may be mentioned an alkali metal salt of an organic sulfonic acid such as 2,5-dichlorobenzene sulfonic acid, 2,4,5-trichlorobenzene sulfonic acid, diphenylsulfone-3-sulfonic acid, diphenylsulfone-3,3'-disulfonic acid, and naphthalene trisulfonic acid.

Further, as the organic carboxylic acid, there can be listed, for example, perfluoroformic acid, perfluoromethane carboxylic acid, perfluoroethane carboxylic acid, perfluoropropane carboxylic acid, perfluorobutane carboxylic acid, perfluoromethylbutane carboxylic acid, perfluorohexane carboxylic acid, perfluoroheptane carboxylic acid, perfluorooctane carboxylic acid and the like. The alkali metal salts of these organic carboxylic acids are used.

Further, as the alkali metal salts and/or alkaline earth metal salts of polystyrene sulfonic acid, an aromatic vinyl resin containing sulfonate groups represented by the following general formula (III) can be used.

[Formula 2]

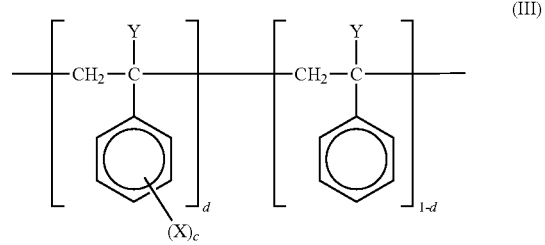

(III)

(wherein X is sulfonate group; Y is hydrogen atom or hydrocarbon group having 1 to 10 carbon atoms; "c" is a number of 1 to 5; "d" denotes mole fraction and is in a range $0 < d \leq 1$).

In the above general formula, the sulfonate group is contained in an alkali metal salt and/or an alkaline earth metal salt of sulfonic acid. As the metal, sodium, potassium, lithium, rubidium, cesium, beryllium, magnesium, calcium, strontium, barium or the like is listed.

In the above general formula, Y is hydrogen atom or hydrocarbon group having 1 to 10 carbon atoms, preferably hydrogen atom or methyl group. "c" is a number of 1 to 5. "d" is in a range represented by $0<d\leq 1$. That is, the aromatic ring can be totally or partially substituted by the sulfonate group (X).

In order to obtain an effect of flame retardance according to the present invention, the percent of substitution of sulfonate groups is determined by considering the amount of the aromatic vinyl resin containing sulfonate groups. There is no limitation on the percent of substitution of sulfonate groups, but an aromatic vinyl resin with 10 to 100% of substitution by sulfonate groups is generally used.

In addition, in the alkali metal salts and/or alkaline earth metal salts of polystyrene sulfonic acid, the aromatic vinyl resin containing sulfonate groups is not limited to the polystyrene resin of the above-described general formula (III), and can be a copolymer with other monomers copolymerizable with styrene-based monomers.

Here, as the method for producing the aromatic vinyl resin containing sulfonate groups, there may be mentioned the following methods:

(1) a method of polymerizing the above-described aromatic vinyl monomers which contain sulfonic acid groups and others or copolymerizing with the other monomers copolymerizable with these aromatic vinyl monomers; and (2) a method wherein an aromatic vinyl polymer, a copolymer of aromatic vinyl monomers and the other monomers copolymerizable with these aromatic vinyl monomers, or a mixture thereof is sulfonated and neutralized with an alkali metal compound and/or an alkaline earth metal compound.

In the above-described method (2), for example, a mixed solution of concentrated sulfuric acid and acetic anhydride is added to a 1,2-dichloroethane solution containing polystyrene resin and the resultant mixture is heated and reacted for several hours to prepare polystyrene sulfonate. Next, the polystyrene sulfonate is neutralized with potassium hydroxide or sodium hydroxide in an amount equivalent to the molar quantity of the sulfonic acid group to obtain a potassium salt or a sodium salt of the polystyrene sulfonic acid.

The aromatic vinyl resin containing sulfonic acid groups and is used in the present invention has a weight average molecular weight of 1,000 to 300,000, preferably 2,000 to 200,000. The weight average molecular weight can be measured with the GPC method.

In the resin composition according to the present invention, the alkali metal salt and/or alkaline earth metal salt of component (E) is added in an amount of generally 0.05 to 2 parts by mass, preferably 0.05 to 1 part by mass, more preferably 0.1 to 1 part by mass with respect to 100 parts by mass of the sum of component (A) and component (B). When component (E) is added in an amount of 0.05 or more part by mass, an effect of improving flame retardance is provided, while added in an amount of 2 or less parts by mass, an effect of improving flame retardance corresponding to the added amount of component (E) is obtained.

With the polycarbonate resin composition according to the present invention, a silicone compound containing functional groups (F) can be admixed optionally so as to further improve flame retardance. The silicone compound containing functional groups is a (poly)organosiloxane having functional groups and is a polymer or a copolymer which has as its molecular framework a basic structure represented by the following general formula (IV):

$$R^3_e R^4_f SiO_{(4-e-f)/2} \quad (IV)$$

(wherein $R^3$ is functional group; $R^4$ is hydrocarbon group having 1 to 12 carbon atoms; "e" and "f" are in a range represented by $0<e\leq 3$, $0<f\leq 3$ and $0<(e+f)\leq 3$).

The functional group has alkoxy group, aryloxy group, polyoxyalkylene group, hydrogen group, hydroxyl group, carboxyl group, silanol group, amino group, mercapto group, epoxy group, vinyl group or the like. Among them it is preferably alkoxy group, hydrogen group, hydroxyl group, and epoxy group, particularly preferably methoxy group and vinyl group.

As the silicone compound containing functional groups, a silicone compound having a plurality of functional groups or a silicone compound having different kinds of functional groups can be used in combination. In this silicone compound containing functional groups, the ratio functional group ($R^3$)/hydrocarbon group ($R^4$) is generally 0.1 to 3, preferably 0.3 to 2. The silicone compound is in a liquid state or a powdery state, preferably having good dispersability on melt-kneading. For example, a liquid silicone compound having a kinematic viscosity of 10 to 500,000 mm²/s at room temperature can be exemplified.

In the resin composition according to the present invention, the silicone compound containing functional groups (F) is added in an amount of generally 0.1 to 3 parts by mass, preferably 0.1 to 2 parts by mass with respect to 100 parts by mass of the sum of component (A) and component (B). When component (F) is added in an amount of 0.1 or more part by mass, an effect of further improving flame retardance is provided, while added in an amount of 3 or less parts by mass, an effect of improving flame retardance corresponding to the added amount of component (F) is obtained.

With the polycarbonate resin composition according to the present invention, polytetrafluoroethylene (PTFE) (G) can be admixed optionally so as to further improve flame retardance (for example, comparable to the ratings of V-0 and 5V as defined in UL94). The average molecular weight of PTFE is preferably 500,000 or more, more preferably 500,000 to 10,000,000.

A PTFE which has a capability of forming fibrils provides still higher performance of preventing the resin melt from dropping. There is no limitation on the PTFE which has a capability of forming fibrils, but there is listed, for example, a PTFE which is classified into Type 3 in accordance with the ASTM Standard. As the specific example of the PTFE, there is listed "Teflon (registered trade mark) 6-J" (DuPont-Mitsui Fluorochemicals Company, Ltd.), "POLYFLON D-1", "POLYFLON F-103", "POLYFLON F201" (all from DAIKIN INDUSTRIES, Ltd.), or "CD076" (Asahi Glass Fluoropolymers Co.,Ltd.).

Further, besides the PTFE which is classified into Type 3, there may be mentioned, for example, "Argoflon F5" (Montefluos S.p.A), "POLYFLON MPA", or "POLYFLON FA-100" (both from DAIKIN INDUSTRIES, Ltd.). These PTFEs can be used solely or two or more kinds in combination. The above-described PTFE which has a capability of forming fibrils is obtained, for example, by polymerizing tetrafluoroethylene in an aqueous medium in the presence of sodium, potassium or ammonium peroxydisulfide under a pressure of 6.9 kPa to 690 kPa (1 psi to 100 psi) at a temperature of 0° C. to 200° C., preferably 20° C. to 100° C.

In the resin composition according to the present invention, PTFE of component (G) is added in an amount of generally 0.1 to 2 parts by mass, preferably 0.1 to 1 part by mass with respect to 100 parts by mass of the sum of component (A) and component (B). When component (G) is added in an amount of 0.1 part by mass or more, a sufficient effect for preventing the resin melt from dropping in the targeted flame retardance can be obtained, while added in an amount of 2 parts by mass or less, an effect of improving flame retardance corresponding to the added amount of component (G) can be obtained. In addition, no adverse effects are produced on impact resistance and appearance of molded articles.

In the polycarbonate resin composition according to the present invention, besides the above-described each component, an additive used in conventional thermoplastic resins or their compositions can be optionally added in an appropriate amount in accordance with the properties requested for molded articles. As the additive, for example, oxidation inhibitor, antistatic agent, UV-light absorber, light stabilizer (weatherproofer), plasticizer, antibacterial agent, compatibility improver, or coloring agent including dye pigment is exemplified and the like.

The polycarbonate resin composition according to the present invention is obtained by mixing the above-described component (A), component (B), optionally each component of (C), (D), (E), (F), and (D), and other components, and kneading the resultant mixture. Mixing and kneading can be carried out with conventional machines. For example, mixing and kneading is carried out, after preliminary mixing using a ribbon blender or a drum tumbler, with Henschel mixer, Banbury mixer, single-screw extruder, twin-screw extruder, multi-screw extruder, coknearder and the like. The heating temperature on kneading is appropriately selected in the range of generally 240° C. to 300° C. In addition, the mixing components other than the polycarbonate resin and styrene resin can be preliminary melt-kneaded with the polycarbonate resin or styrene resin and admixed in the form of a master batch.

An injection molded article according to the present invention is obtained by preparing a raw material of pellets through melt-kneading the above-described components, and subjecting the pellets to injection molding or injection and compression molding. Further, when gas-injection molding method is employed as the injection molding method, light-weight molded articles having excellent appearance without the presence of surface sink can be obtained.

The polycarbonate resin composition according to the present invention provides an injection-molded article which has a heat resistance (HDT) of 110° C. or more and an SFL (spiral flow length) of 35 cm or more which is measured under the conditions including a temperature at 260° C., a thickness of 2 cm, and an injection pressure of 110 MPa.

EXAMPLES

The present invention will be further described in detail with reference to the following examples, but it should be construed that the invention is in no way limited to those examples.

Preparation Example 1

Preparation of Polycarbonate-biphenol Copolymer (1) Synthesis Process of Polycarbonate Oligomer To a 5.6 mass % aqueous solution of sodium hydroxide was added sodium dithionite in an amount of 0.2 mass % with respect to bisphenol A (BPA) to be dissolved in the following step. BPA was dissolved here to make the BPA concentration of 13.5 mass % and an aqueous sodium hydroxide solution containing BPA was prepared. The above aqueous sodium hydroxide solution containing BPA, methylene chloride, and phosgene at flow rates of 40 L/hr, 15 L/hr, and 4.0 kg/hr, respectively, were continuously passed through a tubular reactor having an inside diameter of 6 mm and a tube length of 30 m, where the tubular reactor was equipped with a jacket, through which water was passed so as to keep the temperature of the reaction solution at 40° C. or less.

The reaction solution flown out of the tubular reactor was introduced continuously into a tank reactor having an inside volume of 40 L equipped with sweptback blades and baffles. The reaction was conducted at a temperature of 29° C. to 32° C. by further supplying an aqueous sodium hydroxide solution containing BPA at a flow rate of 2.8 L/hr, a 25 mass % aqueous sodium hydroxide solution at a flow rate of 0.07 L/hr, water at a flow rate of 17 L/hr, and a 1 mass % aqueous solution containing triethylamine at a flow rate of 0.64 L/hr to the tank reactor. The reaction solution was taken out of the tank reactor continuously and settled to remove water phase by separation, whereby methylene chloride phase was collected. Thus obtained oligomer solution of polycarbonate had an oligomer concentration of 338 g/L and a chloroformate group concentration of 0.71 mol/L.

(2) Polymerization Process of the Polycarbonate-biphenol Copolymer

In a tank reactor having an inner volume of 50 L equipped with baffle plates and paddle-type agitator propellers, 15.0 L of the above-described oligomer solution, 10.5 L of methylene chloride, 132.7 g of PTBP (p-tert-butylphenol), and 1.4 mL of triethylamine were charged. Here, an aqueous sodium hydroxide solution containing biphenol (prepared by dissolving 890 g of 4,4'-biphenol in an aqueous solution which was in turn prepared by dissolving 640 g of NaOH and 1.8 g of sodium dithionite ($Na_2S_2O_4$) in 9.3 L of water) was further added and polymerization was carried out for 1 hour. After 10.0 L of methylene chloride were added to dilute the resultant reaction solution, the diluted reaction solution was settled to separate it into an organic phase containing polycarbonate and an aqueous phase containing an excess 4,4'-biphenol and NaOH, whereby an organic phase was separated.

(3) Cleaning Process

The methylene chloride solution of polycarbonate-biphenol copolymer obtained in the above process (2) was washed successively with a 0.03 mol/L aqueous sodium hydroxide solution and a 0.2 mol/L hydrochloric acid, each of which is 15 volume % with respect to the volume of the methylene chloride solution, and further washed repeatedly with pure water until the electrical conductivity of the aqueous phase after washing was reduced to 0.05 μS/m or less.

(4) Flaking Process

The methylene chloride solution of polycarbonate-biphenol copolymer obtained in the above process (3) was concentrated and crashed to obtain flakes of polycarbonate-biphenol copolymer. The flakes were dried at 120° C. for 12 hours under reduced pressure. The biphenyl content was measured to be 15.9 mol % by NMR.

Preparation Example 2

Preparation of Acrylonitrile-styrene Copolymer AS-1

Seventy (70) parts by mass of styrene, 30 parts by mass of acrylonitrile, 1.0 part by mass of calcium phosphate, 0.03 part by mass of "GAFAC GB520" (trade name, dispersing agent, TOHO Chemical Industry Co.,Ltd.), 0.6 part by mass of laurylperoxide, 1.0 part by mass of t-dodecylmercaptan, and 200 parts by mass of ion-exchanged water were charged in a stainless steel reactor equipped with an agitator. The temperature was elevated to 80° C. and polymerization was carried out for 6 hours to obtain a copolymer having an intrinsic viscosity of 0.6 dl/g (at 20° C. in N,N'-dimethylformamide) with 98% conversion.

Examples 1 to 8 and Comparative Examples 1 to 7

Flame Retardant Material

The following components were used.
PC-1: bisphenol A polycarbonate having a viscosity average molecular weight of 17500, "FN1700A" (Idemitsu Petrochemical Co.,Ltd.);
PC-2: bisphenol A polycarbonate containing PC-PDMS having a viscosity average molecular weight of 17500, a PDMS (polydiemthylsiloxane) content of 3 mass %, and a PDMS chain length (n) of 30, "FC1700" (Idemitsu Petrochemical Co.,Ltd.);
PC-3: polycarbonate-biphenol copolymer having a viscosity average molecular weight of 17500 and a biphenol content of 15.9 mol %, obtained in Preparation Example 1;
ABS-1: acrylonitrile-butadiene-styrene copolymer having a rubber content of 60 mass %, "B600N" (Ube Cycon Ltd.);
ABS-2: acrylonitrile-butadiene-styrene copolymer having an MI (4.9 N load at 200° C.) =5.2 g/10 min, "AT-05" (NIPPON A & L Inc.);
AS-1: acrylonitrile-styrene copolymer having an MI (4.9 N load at 200° C.) =38 g/10 min, obtained in Preparation Example 2;
AS-2: acrylonitrile-styrene copolymer having an MI (4.9 N load at 200° C.) =15 g/10 min, "290FF" (Techno Polymer Co.,Ltd.);
Plasticizer-a: phosphoric acid ester, "PFR" (Asahi Denka Kogyo K.K);
Talc: "TP-A25" (Fuji Talc Industrial Co.,Ltd.) having an average particle diameter of 4.9 μm;
Elastomer-1: core-shell type grafted rubber-like elastomer, "EXL2603" (KUREHA Corp.);
Elastomer-2: core-shell type grafted rubber-like elastomer, "C223A" (MITSUBISHI RAYON Co.,Ltd.);
Metal salt-1: potassium perfluoroalkane sulfonate, "MEGAFAC F-114" (DAINIPPON INK AND CHEMICALS, INCORPORATED);
Metal salt-2: powder having an average particle diameter of 30 μm obtained by drying and pulverizing sodium polystyrene sulfonate, "FRPSSN30" (Lion Corp.);
Silicone: methylhydrogen silicone, "X40-2664A" (Shin-Etsu Chemical Co., Ltd.);
PTFE: "CD076" (Asahi ICI Fluoropolymers Co.,Ltd.)

These components were mixed in a ratio given in Table 1 and Table 2, supplied to a vent-type twin-screw extruder (TEM35, Toshiba Machine Co.,Ltd.), melt-kneaded at 260° C. and pelletized. Prior to melt-kneading, 0.1 part by mass of "IRGANOX 1076" (Ciba Specialty Chemicals Corp.) and 0.1 part by mass of "Adekastab C" (Asahi Denka Kogyo K. K) to all of the compositions were added as an oxidation inhibitor.

The resultant pellets were dried at 120° C. for 12 hours and injection-molded at a molding temperature of 260° C. and a mold temperature of 80° C. to obtain test specimens. The resultant specimens were evaluated by the following various tests. The results are given in Table 1 and Table 2.
(1) SFL (Spiral Flow Length)

The test was carried out under the conditions: molding temperature at 280° C., mold temperature at 80° C., wall thickness of 2 mm, and injection pressure of 7.84 MPa (80 kg/cm$^2$). Fluidity is evaluated to be better when the value of SFL is larger. It is preferred that the value of SFL is 35 cm or more.
(2) Izod impact strength The test was carried out in accordance with JIS K7110. Five test specimens were used in the measurement, and the average value is given in the tables.
(3) HDT (Heat Deformation Temperature)

HDT was measured in accordance with ASTM D648 at a load of 1.83 MPa. The HDT value is a rough indication of heat resistance. A practically preferable value of HDT is, although it depends on the purpose of use of the resin composition, generally 100° C. or more.
(4) Flexural Strength The test was carried out in accordance with ASTM D790. Test conditions were: temperature at 23° C. and a wall thickness of test specimens of 4 mm.
(5) Flexural Modulus The test was carried out in accordance with ASTM D790. Test conditions were: temperature at 23° C. and a wall thickness of test specimens of 4 mm.
(6) Flame Retardant Test Test specimens having an outside dimension of 127 mm by 12.7 mm and a wall thickness of 1.5 mm were used. Vertical flammability test was carried out in accordance with Underwriters Laboratory Subject 94 (UL94 specification).
(7) Limiting Oxygen Index (LOI)

LOI was measured in accordance with ASTM D2863.

TABLE 1

| | Components admixed (parts by mass) | Example 1 | Example 2 | Example 3 | Example 4 | Example 5 | Example 6 | Example 7 | Example 8 |
|---|---|---|---|---|---|---|---|---|---|
| (A) | PC-1 | 15 | 35 | | | | | 40 | |
| | PC-2 | | 30 | 30 | 30 | 35 | 35 | | |
| | PC-3 | 70 | 20 | 50 | 50 | 50 | 50 | 40 | 85 |
| (B) | ABS-1 | | | | 20 | | | | |
| | ABS-2 | 15 | 15 | 20 | | | | 20 | |
| | AS-1 | | | | | 15 | | | 15 |
| | AS-2 | | | | | | 15 | | |
| | Plasticizer-a | | | | | | | | |
| (C) | Talc | | 10 | 10 | 10 | 10 | 10 | 10 | 10 |
| (D) | Elastomer-1 | | | | | 5 | | | 5 |
| | Elastomer-2 | | | | | | 5 | | |
| (E) | Metal salt-1 | 0.1 | | | | | | 0.1 | |
| | Metal salt-2 | | | | | | | | 0.1 |

TABLE 1-continued

| Components admixed (parts by mass) | | Example 1 | Example 2 | Example 3 | Example 4 | Example 5 | Example 6 | Example 7 | Example 8 |
|---|---|---|---|---|---|---|---|---|---|
| (F) | Silicone | | | | | | | 0.3 | 0.3 |
| (G) | PTFE | 0.5 | 0.5 | 0.5 | 0.5 | 0.5 | 0.5 | 0.5 | 0.5 |
| Evaluation | SFL (260° C., 2 mm thick) (cm) | 41 | 37 | 40 | 42 | 45 | 42 | 43 | 43 |
| | Izod impact strength (kJ/cm$^2$) | 70 | 40 | 45 | 45 | 40 | 40 | 40 | 40 |
| | HDT (load: 1.83 MPa) (° C.) | 118 | 125 | 125 | 118 | 117 | 116 | 120 | 120 |
| | Flexural strength (MPa) | 60 | 94 | 96 | 92 | 91 | 92 | 94 | 93 |
| | Flexural modulus (MPa) | 2200 | 3500 | 3500 | 3450 | 3500 | 3500 | 3500 | 3500 |
| | Flame retardance (UL94, 1.5 mm thick) | V-0 | V-0 | V-0 | V-0 | V-0 | V-0 | V-0 | V-0 |
| | LOI | 40 | 39 | 42 | 41 | 41 | 41 | 40 | 44 |

TABLE 2

| Components admixed (parts by mass) | | Comparative example 1 | Comparative example 2 | Comparative example 3 | Comparative example 4 | Comparative example 5 | Comparative example 6 | Comparative example 7 |
|---|---|---|---|---|---|---|---|---|
| (A) | PC-1 | 85 | 80 | 55 | 50 | 90 | 17 | |
| | PC-2 | | | 30 | 30 | | 30 | 30 |
| | PC-3 | | 5 | | 5 | | 50 | 10 |
| (B) | ABS-1 | 15 | 15 | | | 10 | 3 | 60 |
| | ABS-2 | | | 15 | 15 | | | |
| | AS-1 | | | | | | | |
| | AS-2 | | | | | | | |
| | Plasticizer-a | | | | | 5 | | |
| (C) | Talc | | 10 | 10 | 10 | 10 | 10 | 10 |
| (D) | Elastomer-1 | | | | | | | |
| | Elastomer-2 | | | | | | | |
| (E) | Metal salt-1 | | | | | | | |
| | Metal salt-2 | 0.1 | 0.1 | | | | | |
| (F) | Silicone | | | | | | | |
| (G) | PTFE | 0.5 | 0.5 | 0.5 | 0.5 | 0.5 | 0.5 | 0.5 |
| Evaluation | SFL (260° C., 2 mm thick) (cm) | 41 | 39 | 37 | 37 | 35 | 25 | 50 |
| | Izod impact strength (kJ/cm$^2$) | 65 | 40 | 40 | 40 | 10 | 20 | 10 |
| | HDT (load: 1.83 MPa) (° C.) | 118 | 120 | 120 | 120 | 96 | 120 | 110 |
| | Flexural strength (MPa) | 55 | 96 | 95 | 95 | 95 | 95 | 80 |
| | Flexural modulus (MPa) | 2200 | 3500 | 3500 | 3500 | 3000 | 3500 | 3200 |
| | Flame retardance (UL94, 1.5 mm thick) | V-2out | V-1 | V-1 | V-1 | V-1 | V-0 | V-1 |
| | LOI | 30 | 33 | 33 | 33 | 33 | 44 | 33 |

From the results of evaluation described above, the following have been found.

(a) Examples 1 to 8 are resin compositions that exhibit not only an excellent balance among rigidity, heat resistance, fluidity and impact resistance but also an excellent flame retardance, because polycarbonate-biphenol copolymer component [component (A-1)] is used in an amount more than a specified amount, thereby flame retardance is improved and the amount of an alloying material can be increased.

(b) Comparative examples 1 and 2 are resin compositions similar to the resin composition of Example 1 except that the polycarbonate-biphenol copolymer component [component (A-1)] is not contained or contained in less than a specified amount, providing fluidity comparable to the resin composition of Example 1, but flame retardance is lowered.
(c) Comparative examples 3 and 4 are resin compositions similar to the resin composition of Example 2 except that the polycarbonate-biphenol copolymer component [component (A-1)] is not contained or contained in less than a specified amount, providing fluidity comparable to the resin composition of Example 2, but flame retardance is lowered.
(d) Comparative example 5 is a resin composition which contains phosphoric acid ester as a plasticizer, providing improved fluidity, but is poor in flame retardance and heat resistance.
(e) Comparative example 6 does not exhibit improved fluidity as compared with the resin composition of Example 4, because the amount of component (B) is less than a specified amount with respect to the sum of component (A) and component (B).
(f) Comparative example 7 shows lowered heat resistance, impact strength, and flame resistance as compared with the resin composition of Example 4, because the amount of component (B) is more than a specified amount with respect to the sum of component (A) and component (B).

Industrial Applicability

The polycarbonate resin composition according to the present invention exhibits not only an excellent balance among fluidity, rigidity, heat resistance, and impact resistance while maintaining flame retardance, but also an excellent performance of recycling efficiency. The injection-molded article of the polycarbonate resin composition is suitably used for automobile parts, or housings for various kinds of articles or parts for OA (office automation) instruments, electrical and electronics instruments or home electric appliances.

The invention claimed is:
1. A polycarbonate resin composition comprising a resin mixture of
component (A) comprising
(A-1) 10 to 62.5 mass % of an aromatic polycarbonate resin wherein dihydroxybiphenyl having the following formula (I):

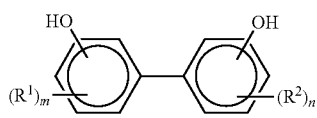

wherein $R^1$ and $R^2$ represent independently a group selected from a hydrogen atom, an alkyl group having 1 to 6 carbon atoms, a cycloalkyl group having 5 to 7 carbon atoms, a substituted or unsubstituted aryl group having 6 to 12 carbon atoms and halogen atom; m and n are each an integer of 1 to 4 is used in an amount of 5 to 50 mol % with respect to the total amount of divalent phenol as a raw material in the formation of the aromatic polycarbonate resin and
(A-2) 90 to 37.5 mass % of an aromatic polycarbonate resin other than the aromatic polycarbonate resin of component (A-1), and an amorphous styrene resin (B), in a mass ratio of component (A) to component (B) of 50:50 to 95:5,
wherein aromatic polycarbonate resin (A-2) is an aromatic polycarbonate resin containing polyorganosiloxane.

2. The polycarbonate resin composition according to claim 1, wherein the polyorganosiloxane in the aromatic polycarbonate resin containing polyorganosiloxane is polydimethylsiloxane.

3. The polycarbonate resin composition according to claim 1, wherein the amorphous styrene resin of component (B) is at least one copolymer selected from the group consisting of ABS resin (acrylonitrile-butadiene rubber-styrene copolymer), AES resin (acrylonitrile-ethylene propylene rubber-styrene copolymer), AAS resin (acrylonitrile-acrylic rubber-styrene copolymer), MBS resin (methylmethacrylate-butadiene rubber-styrene copolymer), AS resin (acrylonitrile-styrene copolymer) and MS resin (methylmethacrylate-styrene copolymer).

4. The polycarbonate resin composition according to claim 1, further comprising an inorganic filler (C) in an amount of 1 to 20 parts by mass with respect to 100 parts by mass of the sum of component (A) and component (B).

5. The polycarbonate resin composition according to claim 1, further comprising an impact resistance improver (D) in an amount of 1 to 15 parts by mass with respect to 100 parts by mass of the sum of component (A) and component (B).

6. The polycarbonate resin composition according to claim 1, wherein said polycarbonate resin composition has a heat deformation temperature of 110° C. or more.

7. The polycarbonate resin composition according to claim 6, wherein said polycarbonate resin composition has a spiral flow length of 35 cm or more.

8. The polycarbonate resin composition according to claim 7, wherein said polycarbonate resin composition has a flame retardance of V-0.

9. An injection-molded article made of the polycarbonate resin composition according to claim 1.

10. The polycarbonate resin composition according to claim 1, further comprising at least one component (E) in an amount of 0.05 to 2 parts by mass with respect to 100 parts by mass of the sum of component (A) and component (B), wherein said at least one component (E) is selected from the group consisting of:
a metal salt of a perfluoroalkane sulfonic acid represented by formula (II)

$$(C_aF_{2a+1}SO_3)_bM \qquad (II),$$

wherein a is an integer of 1 to 10, M is an alkali metal or an alkaline earth metal, and b is the atomic valency of M, and
an aromatic vinyl resin containing sulfonate groups having a weight average molecular weight of from 1,000 to 300,000, wherein said aromatic vinyl resin is represented by formula (III)

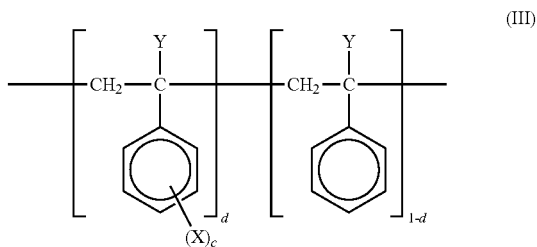

wherein X is a sulfonate group of an alkali metal salt of sulfonic acid or of an alkaline earth metal salt of sulfonic acid, Y is a hydrogen atom or a hydrocarbon group having 1 to 10 carbon atoms, c is a number of 1 to 5, and d represents mole fraction and is in a range of $0<d\leq1$.

11. The polycarbonate resin composition according to claim 10, comprising a potassium perfluoroalkane sulfonate as component (E).

12. The polycarbonate resin composition according to claim 10, comprising sodium polystyrene sulfonate as component (E).

13. The polycarbonate resin composition according to claim 10, further comprising a silicone compound (F), containing functional groups, in an amount of 0.1 to 0.3 parts by mass with respect to 100 parts by mass of the sum of component (A) and component (B).

14. The polycarbonate resin composition according to claim 13, wherein the silicone compound (F), containing functional groups, is a polymer or a copolymer having a structure represented by formula (IV):

$$R^3_e R^4_f SiO_{(4-e-f)/2} \quad (IV)$$

wherein
$R^3$ is an alkoxy group, an aryloxy group, a polyoxyalkylene group, hydrogen, a hydroxyl group, a carboxyl group, a silanol group, an amino group, a mercapto group, an epoxy group, or a vinyl group,
$R^4$ is a hydrocarbon group having 1 to 12 carbon atoms,
$0<e\leq3$,
$0<f\leq3$, and
$0<(e+f)<3$.

* * * * *